United States Patent
Kahle et al.

(10) Patent No.: US 6,725,354 B1
(45) Date of Patent: Apr. 20, 2004

(54) SHARED EXECUTION UNIT IN A DUAL CORE PROCESSOR

(75) Inventors: James Allan Kahle, Austin, TX (US); Charles Roberts Moore, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 644 days.

(21) Appl. No.: 09/594,631

(22) Filed: Jun. 15, 2000

(51) Int. Cl.[7] .................................................. G06F 9/00
(52) U.S. Cl. ........................................ 712/34; 712/222
(58) Field of Search ............................ 712/34, 32, 35, 712/36, 23, 25, 26, 27, 42, 41, 205, 216, 222, 233

(56) References Cited

U.S. PATENT DOCUMENTS

| | | | | |
|---|---|---|---|---|
| 4,476,523 A | * | 10/1984 | Beauchamp | ................ 712/222 |
| 4,476,537 A | * | 10/1984 | Blau et al. | .................. 708/510 |
| 4,928,223 A | * | 5/1990 | Dao et al. | ................... 712/247 |
| 5,619,439 A | * | 4/1997 | Yu et al. | ...................... 708/500 |
| 5,685,009 A | * | 11/1997 | Blomgren et al. | ............ 712/23 |
| 5,825,678 A | * | 10/1998 | Smith | ......................... 708/495 |
| 5,887,160 A | * | 3/1999 | Lauritzen et al. | ........... 712/222 |
| 6,148,395 A | * | 11/2000 | Dao et al. | ................... 712/222 |

* cited by examiner

Primary Examiner—Henry W. H. Tsai
(74) Attorney, Agent, or Firm—Joseph P. Lally; Thomas E. Tyson; Volel Emile

(57) ABSTRACT

A microprocessor includes a first processor core and a second processor core. The first core includes a first processing block. The first processing block includes an execution unit suitable for executing a first type of instruction. The second core includes a second processing block. The second processing block includes an execution unit suitable for executing an instruction if the instruction is of the first type. The processor further includes a shared execution unit. The first and second processor cores are adapted to forward an instruction to the shared execution unit for execution if the instruction is of a second type. In one embodiment, the first type of instruction includes fixed point instructions, load/store instructions, and branch instructions and the second type of instruction includes floating point instructions.

18 Claims, 4 Drawing Sheets

SHARED EXECUTION UNIT IN A DUAL CORE PROCESSOR

BACKGROUND

1. Field of the Present Invention

The present invention generally relates to the filed of microprocessors and more particularly to a dual core microprocessor implemented with one or more shared execution units.

2. History of Related Art

Increased microprocessor performance is sometimes achieved by simply increasing the number of resources, such as execution units in the microprocessors. Increasing the number of resources theoretically enables a corresponding increase in the maximum number of instructions that the processor can execute. While increased performance is highly desirable, the increase in performance achieved by any additional resources typically must be weighed against the cost required to achieve the increased performance in the form of increased device size. Larger devices are more expensive because (1) fewer devices can be fabricated per wafer and (2) the probability of a random defect rendering the device non-functional increases with the size of the device. Therefore, because of the significant cost considerations associated with each additional resource, it is highly desirable to add only those additional resources where the performance benefit achieved more than compensates for the increased cost. Conversely, it is desirable to share resources where the performance penalty resulting from the shared resource is more than offset by the reduction in size and cost.

SUMMARY OF THE INVENTION

A microprocessor, data processing system and a method of operation are disclosed. The processor includes a first processor core and a second processor core that are preferably fabricated on a single substrate. The first core includes a first instruction cache, a first data cache, and a first processing block. The first processing block is adapted to retrieve instructions from the first instruction cache and data from the first data cache. The first processing block includes an execution unit suitable for executing a first type of instruction. The second core includes a second instruction cache, a second data cache, and a second processing block. The second processing block is adapted to retrieve instructions from the second instruction cache and data from the second data cache. The second processing block includes an execution unit suitable for executing an instruction if the instruction is of the first type. The processor further includes a shared execution unit. The first and second processor cores are adapted to forward an instruction to the shared execution unit for execution if the instruction is of a second type. In one embodiment, the first type of instruction includes fixed point instructions, load/store instructions, and branch instructions and the second type of instruction includes floating point instructions. The processor may further include an arbiter an arbiter connected to the shared execution unit for arbitrating between the first processor core and the second processor core for access to the shared execution unit. In one embodiment, each processor core may include a shared execution enable bit that is utilized by the arbiter to control the status of the shared enable bit. In one embodiment the shared execution unit includes a pair of execution pipes. The shared execution unit may be connected to and receive instructions from a shared issue unit.

BRIEF DESCRIPTION OF THE DRAWINGS

Other objects and advantages of the invention will become apparent upon reading the following detailed description and upon reference to the accompanying drawings in which.

Figure 1:
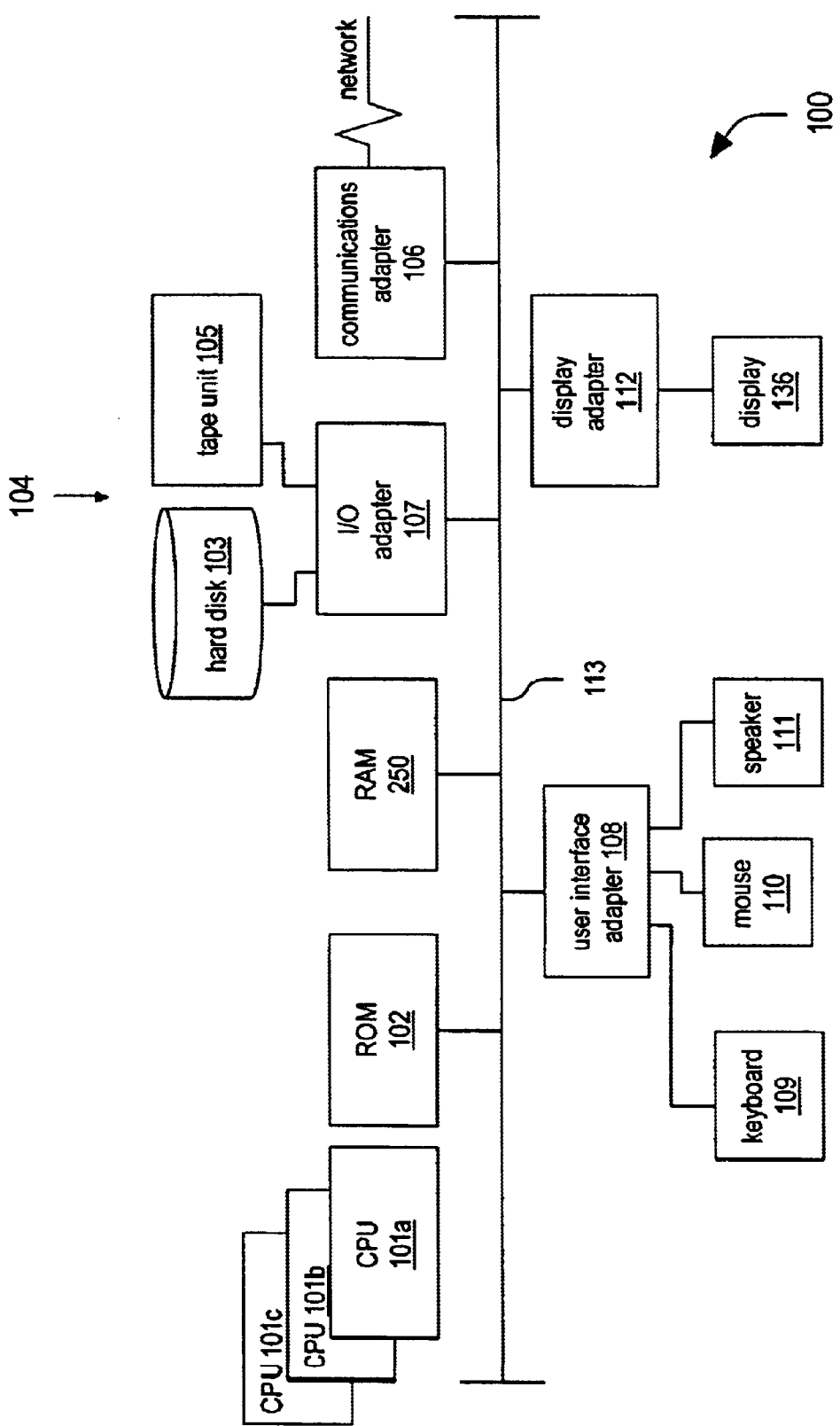
FIG. 1 is a block diagram of a data processing system including a shared resource processor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to FIG. 1, an embodiment of a data processing system 100 according to the present invention is depicted. System 100 has one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufinann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the *PC87338/PC97338 ACPI 1.0 and PC98/99 Compliant SuperI/O* data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1. Additional detail concerning the AIX operating system is available in *AIX Version 4.3 Technical Reference: Base Operating System and Extensions, Volumes 1 and 2* (order numbers SC23-4159 and SC23-4160); *AIX Version 4.3 System User's Guide: Communications and Networks* (order number SC23-4122); *and AIX Version 4.3 System User's Guide: Operating System and Devices* (order number SC23-4121) from IBM Corporation at www.ibm.com and incorporated by reference herein.

Figure 2:
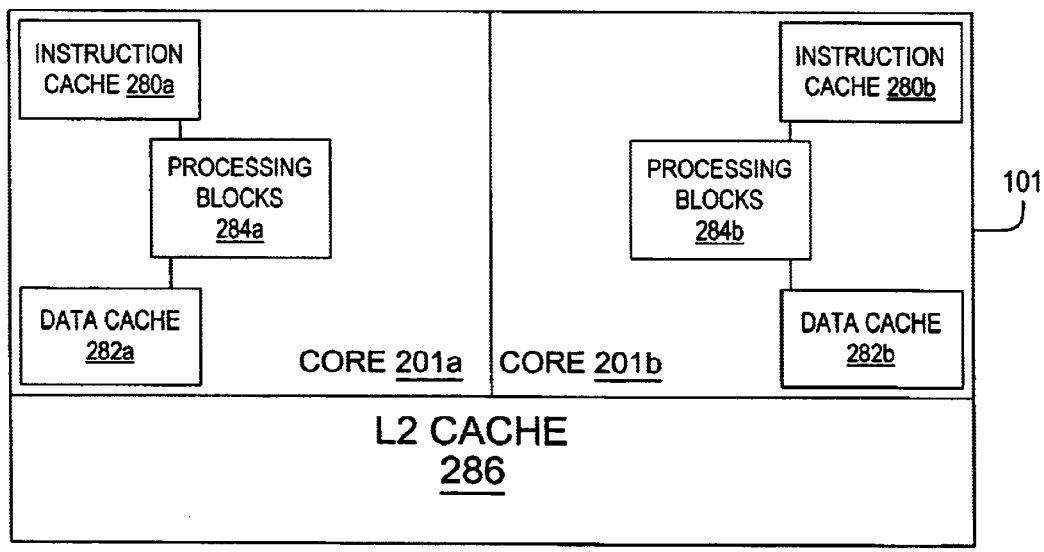
FIG. 2 is a block diagram of a dual core processor.

Turning now to FIG. 2, a block diagram of a processor 101 according to one embodiment of the present invention is illustrated. In the depicted embodiment, processor 101 includes dual processor cores 201a and 201b that are preferably formed on a single substrate comprised of a semiconductor material such as silicon. In one embodiment, processor cores 201a and 201b are substantially duplicative of each other. Each core 201 may include an L1 instruction cache 280, an L1 data cache 282, and a processing block 284. Each processing block 284 (as described in greater detail below with respect to FIG. 3) includes logic suitable for determining an address of the next instruction to execute and retrieving the instruction at the determined address from L1 instruction cache (or from L2 cache 286 or system memory 250). In addition, each processing block 284 includes logic for executing the instruction including fetching any data operands from L1 data cache 282 and storing the instruction's result 280 in appropriate registers or in L1 data cache 282.

Figure 3:
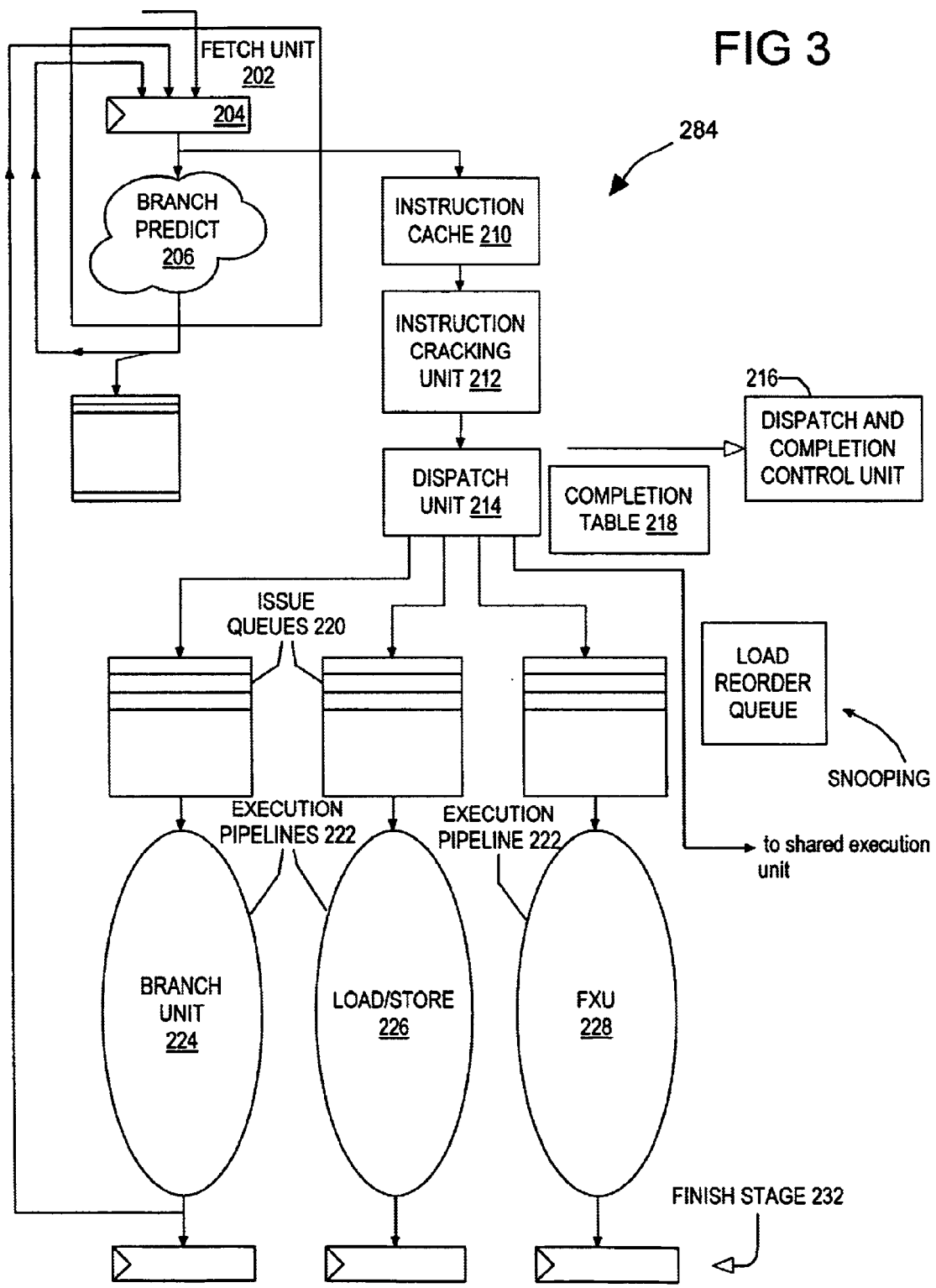
FIG. 3 is a block diagram of a selected features of a processing block of a processor according to one embodiment of the invention.

Turning now to FIG. 3, processing block 284 of processor core 201 includes an instruction fetch unit 202 suitable for generating an address of the next instruction to be fetched. The instruction address generated by fetch unit 202 is loaded into a next instruction address latch 204 and provided to an instruction cache 210. Fetch unit 202 may include branch prediction logic 206 adapted to make an informed prediction of the outcome of a decision that effects the program execution flow. The ability to correctly predict branch decisions is a significant factor in the overall ability of processor core 201 to achieve improved performance by executing instructions speculatively and out-of-order. The address produced by fetch unit 202 is provided to an instruction cache 210, which contains a subset of the contents of system memory in a high speed storage facility. If the address instruction generated by fetch unit 202 corresponds to a system memory location that is currently replicated in instruction cache 210, instruction cache 210 forwards the corresponding instruction to cracking logic 212. If the instruction corresponding to the instruction address generated by fetch unit 202 does not currently reside in instruction cache 210, the contents of instruction cache 210 must be updated with the contents of the appropriate locations in system memory.

The depicted embodiment of processor core 201 includes cracking logic 212 adapted to modify an incoming instruction stream to produce a set of instructions optimized for executing in an underlying execution pipeline at extremely high operating frequencies (i.e., operating frequencies exceeding 1 GHz). In one embodiment, for example, cracking logic 212 receives instructions in a 32-bit wide format such as the instruction set supported by the PowerPC® microprocessor. Detailed information regarding the PowerPC® instruction set is available in the *PowerPC 620 RISC Microprocessor User's Manual* available from Motorola, Inc. (Order No. MPC620UM/AD), which is incorporated by reference herein. In one embodiment, the format of the instructions generated by cracking logic 212 include explicit fields for information that is merely implied in the format of the fetched instructions such that the format of instructions generated by cracking logic 212 is wider than the format of instructions. In one embodiment, for example, the fetched instructions are encoded according to a 32-bit instruction format while the instructions generated by cracking logic 212 are formatted according to a 64-bit (or wider) instruction format. Cracking logic 212 is designed to generate these wide instructions according to a predefined set of cracking rules. The wide instructions generated by cracking logic 212 facilitate high speed execution by including explicit references to instruction operands. In one embodiment, cracking logic 212 as contemplated herein is designed to organize a set of fetched instructions into instruction "groups," each of which includes a set of one or more instructions. Organizing sets of instructions into instruction groups facilitates high speed execution by, among other things, simplifying the logic needed to maintain and update rename registers and completion tables for a large number of in-flight instructions.

Returning now to FIG. 3, the instruction groups generated by cracking unit 212 are forwarded to dispatch unit 214. Dispatch unit 214 is responsible for determining which instructions are capable of being executed and forwarding these executable instructions to issue queues 220. In addition, dispatch unit 214 communicates with dispatch and completion control logic 216 to keep track of the order in which instructions were issued and the completion status of these instructions to facilitate out-of-order execution. In the embodiment of processor core 201 in which cracking unit 212 organizes incoming instructions into instruction groups as discussed above, each instruction group 302 is assigned a group tag (GTAG) by completion and control logic 216 that conveys the ordering of the issued instruction groups. As an example, dispatch unit 214 may assign monotonically increasing values to consecutive instruction groups. With this arrangement, instruction groups with lower GTAG values are known to have issued prior to (i.e., are older than) instruction groups with larger GTAG values. In association with dispatch and completion control logic 216, a completion table 218 is utilized in one embodiment of the present invention to track the status of issued instruction groups.

In the embodiment of processor core 201 depicted in FIG. 3, instructions are issued from dispatch unit 214 to issue queues 220 where they await execution in corresponding execution pipes 222. Each processor core 201 may include a variety of types of executions pipes, each of which is designed to execute a subset of the processor's instruction set. In one embodiment, execution pipes 222 may include, for example, a branch unit pipeline 224, a load store pipeline 226, and a fixed point arithmetic unit 228. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 that is eligible for execution is the next instruction issued to execution pipes 222. In this embodiment, the GTAG values assigned by dispatch unit 214 are utilized to determine the relative age of instructions pending in the issue queues 220. Prior to issue, the destination register operand of the instruction is assigned to an available rename GPR. When an instruction is ultimately forwarded from issue queues 220 to the appropriate execution pipe, the execution pipe performs the appropriate operation as indicated by the instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

Figure 4:
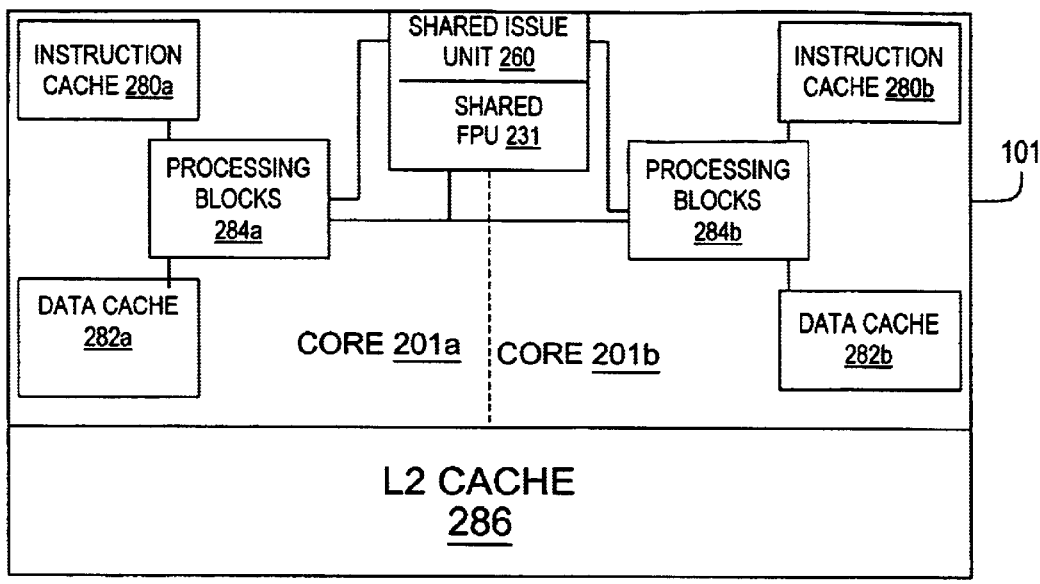
FIG. 4 is a block diagram of a dual-core, shared resource processor according to one embodiment of the invention.

Turning now to FIG. 4, an embodiment of processor 101 is depicted in which the processor cores 201a and 201b share an execution unit. In the depicted embodiment, floating point unit 231 is shared by first core 201a and second core 201b. While shared resources in general are achieved at the expense of processor performance, shared floating point unit 231 as disclosed herein is accomplished without a significant performance penalty under the most commonly encountered operating environments. More specifically, floating point performance in floating point intensive applications is typically limited by the bandwidth of the memory subsystem rather than by the execution unit itself because the floating point computations are typically retrieving operands from main memory. In other words, the data segments accessed by floating point intensive code are not likely to be found in the processor's L2 cache and are even less likely to be found in the processor's L1 data cache. The present invention capitalizes on this reality of floating point performance to achieve significant savings in die size without a corresponding performance penalty by designing the floating point resource as a shared facility in a dual core processor.

Thus, as depicted in FIG. 4, each core 201 of processor 101 includes at least one execution unit within its processing block 284 that is suitable for processing certain types of data including processor instructions such as fixed point instructions, load-store instructions, and branch instructions. In addition, processor 101 includes a shared resource that is suitable for processing certain types of data including processor instructions such as (in the depicted embodiment) floating point instructions. Instructions of the first type issued by first processor core 201a are executed in first processing block 284a while instructions of the first type issue by second processor core 201b are executed in the second processing block 284b. Instructions of the second type issued by either processor core 201 are executed in the shared execution unit 231.

Figure 5:
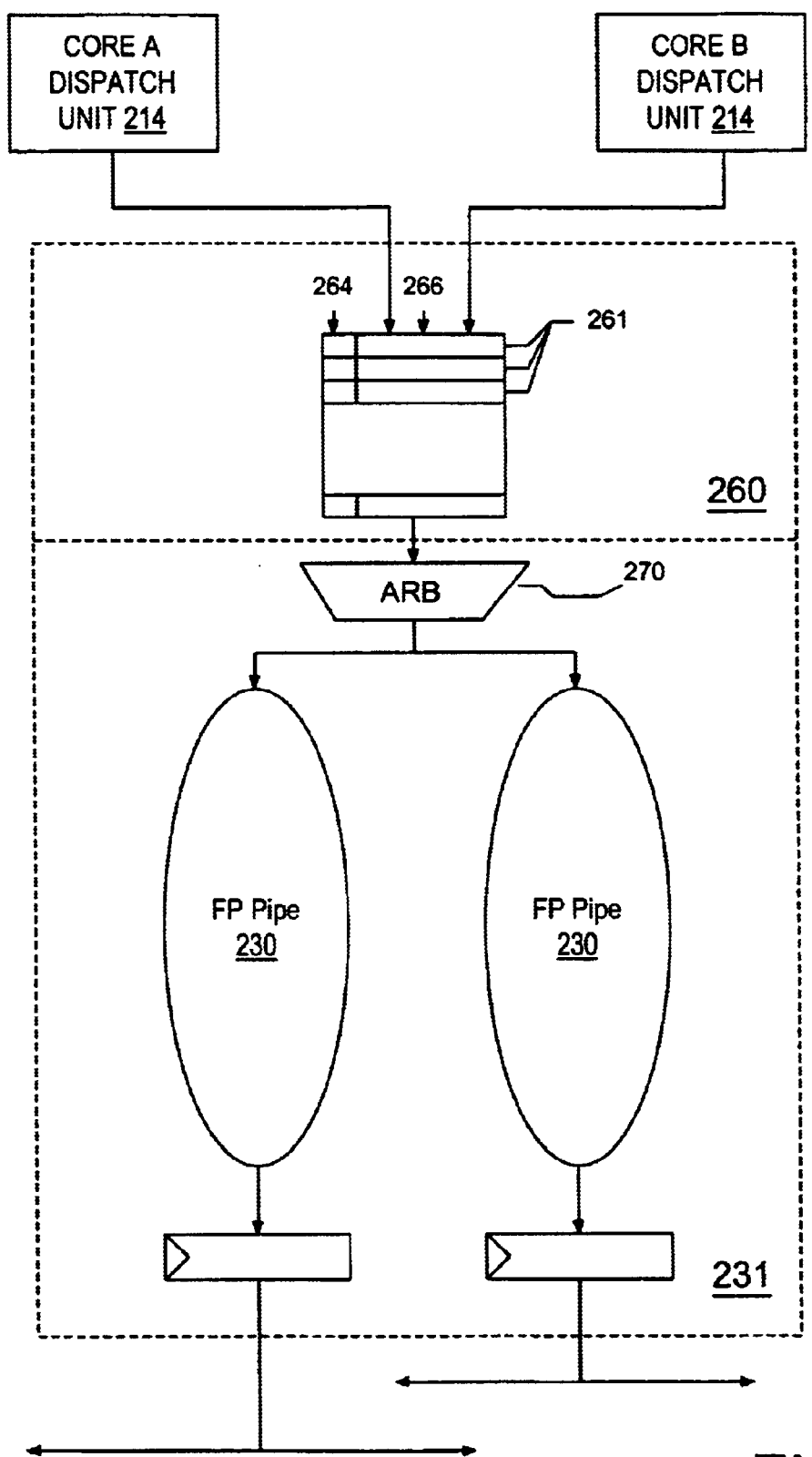
FIG. 5 is a block diagram of a shared floating point unit suitable for use in the processor of FIG. 4.

Turning to FIG. 5, a shared floating point unit 231 according to one embodiment of the invention is depicted. In the depicted embodiment, floating point unit 231 includes a pair of floating point execution pipelines 230 that receive instructions from a floating point issue queue 260. Floating point issue queue 260 receives instructions from a dispatch unit 214a of first processor core 201a and from dispatch unit 214b of second processor core 201b. To maintain the origin of floating point units, each entry 261 in issue queue 260 includes a tag 264 and a floating point instruction 266. Tag 264 of each entry 261 identifies either first processor core 201a or second processor core 201b as the source of entry's corresponding instruction 266. An arbitration unit 270 at the output of shared issue queue 260 is adapted to issue instructions 266 from issue queue 260 to either of the floating point pipelines 230 for execution. Arbitration preferably employs some manner of fairness algorithm to ensure that neither of the cores 201a or 201b is starved for access to shared floating point unit 231. In one embodiment, for example, arbitration unit might attempt to issue the oldest pending and eligible instruction from first processor core 201a in one cycle and the oldest pending and eligible instruction from processor core 201b in a second cycle. If one of the processor cores has no pending and eligible floating point instructions in queue 260, the remaining processor core may issue any pending and eligible instructions in consecutive cycles. In the dual pipeline architecture of shared floating point unit 231 depicted in FIG. 5, arbitration unit is responsible for determining whether sufficient resources are available to issue instructions in issue queue 260 for execution. Upon determining that sufficient resources are available for executing an instruction, arbitration unit 270 selects one of the eligible instructions from one of the dispatch units 214 and forwards the selected instruction to one of the floating point execution pipelines 230 for execution.

In one embodiment arbitration of floating point instructions may utilize floating point enable bits in each of the processor cores 201. In this embodiment, each processor core 201 includes a floating point enable bit that controls the core's ability to dispatch instructions to floating point issue queue 260. Arbitration unit may participate in setting the floating point enable bits and may attempt to read the bits before making instruction issue decisions. In another embodiment, each processor core 201 may have access to the floating point enable bit of the other processor core. In this embodiment, first processor cores 201a, for example, could disable the ability of second processor core 201b to dispatch floating point instructions.

When a floating point instruction 266 completes execution in one of the pipelines 230, the depicted embodiment of shared floating point unit 231 routes instruction 266 to first processor core 201a and second processor core 201b. Each processor core 201 then examines the floating point instruction's tag 264 to determine the instruction's "owner." The processor core 201 that owns the floating point instruction will store the instructions result in an appropriate rename register while the processor core 201 that does not own the instruction will discard or ignore the instruction's results. The shared floating point resource 231 optimizes performance and size (i.e., cost) by matching the resource's bandwidth for processing floating point instructions with the system's ability to issue floating point instructions, which is a function of the system's ability to retrieve floating point operands from memory. Thus, while the sharing of any resource by a multi-processor exists as a theoretical possibility, the sharing of the floating point unit in a single chip, dual core processor is optimally suited to achieve the benefits of sharing (i.e., less space) without suffering the consequences (i.e., poor performance due to excessive interference in the shared unit) that would result from the sharing of other units such as the fixed point and load store units. Moreover, by incorporating an appropriate instruction tracking mechanism such as the described tagging scheme, shared floating point unit 231 enables the simultaneous processing of distinct execution streams or "threads" in a single shared resource.

It will be apparent to those skilled in the art having the benefit of this disclosure that the present invention contemplates a dual core microprocessor using selective and optimized resource sharing. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A processor, comprising;
   first and second processor cores, each core including an execution unit suitable for processing data if the data is of a first type;
   means for distinguishing between data of the first type and data of a second type;
   a shared execution unit suitable for processing data of the second type wherein the shared execution unit includes a pair of matching execution pipes; and
   means for forwarding data of the second type to the shared execution unit.

2. The processor of claim 1, wherein data of the first type comprises an instruction selected from the group including fixed point instructions, load/store instructions, and branch instructions.

3. The processor of claim 1, wherein data of the second type comprises a floating point instruction.

4. The processor of claim 1, further comprising an arbiter connected to the shared execution unit for arbitrating between the first processor core and the second processor core for access to the shared execution unit.

5. The processor of claim 4, wherein each of the processor cores includes a shared execution enable bit, and wherein the arbiter arbitrates between the first and second cores based upon the state of the shared execution enable bits.

6. The processor of claim 1, wherein the shared execution unit is connected to and receives instructions from a shared issue unit.

7. A method of operating a processor, comprising:
   executing a first instruction in an execution unit of a first core of a dual core processor if the first instruction is of a first type;
   executing a second instruction in an execution unit of a second core of the dual core processor if the second instruction is of the first type; and
   executing the first and second instructions in matching execution pipelines within a shared execution unit of the dual core processor if the instructions are of a second type.

8. The method of claim 7, wherein instructions of the first type comprises fixed point instructions, load/store instructions, and branch instructions.

9. The method of claim 7, wherein instructions of the second type comprise floating point instructions.

10. The method of claim 7, further comprising arbitrating between the first and second instructions for access to the shared execution unit if the instructions are of the second type.

11. The method of claim 10, wherein arbitrating between the first and second instructions includes determining the state of first and second floating point enables of the first and second cores respectively.

12. The method of claim 7, further comprising dispatching first and second instructions of the second type to a shared issue queue connected to the shared execution unit.

13. A data processing system including system memory, hard disk, keyboard, mouse, and display, the system comprising:
   first and second processor cores, each core including an execution unit suitable for processing data if the data is of a first type;
   means for distinguishing between data of the first type and data of a second type;
   a shared execution unit suitable for processing data of the second type wherein the shared execution unit includes a matching pair of execution pipes; and
   means for forwarding data of the second type to the shared execution unit.

14. The system of claim 13, wherein the first type of data comprises an instruction selected from the group including fixed point instructions, load/store instructions, and branch instructions.

15. The system of claim 13, wherein the second type of data comprises a floating point instruction.

16. The system of claim 13, further comprising an arbiter connected to the shared execution unit for arbitrating between the first processor core and the second processor core for access to the shared execution unit.

17. The system of claim 16, wherein each of the processor cores includes a shared execution enable bit, and wherein the arbiter arbitrates between the first and second cores based upon the state of the shared execution enable bits.

18. The system of claim 13, wherein the shared execution unit is connected to and receives instructions from a shared issue unit.

* * * * *